(12) United States Patent
Yamazaki et al.

(10) Patent No.: US 9,884,267 B2
(45) Date of Patent: Feb. 6, 2018

(54) PREPARATIVE SEPARATION-PURIFICATION SYSTEM FOR CONTROLLING THE PASSAGE OF SOLUTION THEREIN

(71) Applicant: Shimadzu Corporation, Kyoto-Shi (JP)

(72) Inventors: Tomoyuki Yamazaki, Kyoto (JP); Stasica Przemyslaw, Hertfordshire (GB); Bob Boughtflower, Hertfordshire (GB)

(73) Assignee: Shimadzu Corporation, Kyoto (JP)

( * ) Notice: Subject to any disclaimer, the term of this patent is extended or adjusted under 35 U.S.C. 154(b) by 692 days.

(21) Appl. No.: 13/893,133

(22) Filed: May 13, 2013

(65) Prior Publication Data
US 2013/0306537 A1    Nov. 21, 2013

(30) Foreign Application Priority Data

May 15, 2012    (JP) .................................. 2012-111178

(51) Int. Cl.
*B01D 15/08*    (2006.01)
*B01D 15/22*    (2006.01)
(Continued)

(52) U.S. Cl.
CPC ........... *B01D 15/22* (2013.01); *B01D 15/247* (2013.01)

(58) Field of Classification Search
USPC ............ 73/53.01, 61.52, 61.53, 61.56, 61.57
See application file for complete search history.

(56) References Cited

U.S. PATENT DOCUMENTS

| | | | |
|---|---|---|---|
| 3,878,973 A * | 4/1975 | Riccio ..................... | B05B 11/06 |
| | | | 222/319 |
| 4,451,365 A * | 5/1984 | Sattler ................ | G01N 30/6047 |
| | | | 210/198.2 |

(Continued)

FOREIGN PATENT DOCUMENTS

| | | |
|---|---|---|
| GB | 2465954 A | 6/2010 |
| GB | 2465955 A | 6/2010 |

(Continued)

OTHER PUBLICATIONS

Examination Report Received for Chinese Patent Application No. 201310180198.1 dated Oct. 31, 2014, 6 pages (1 page of English Translation & 5 pages of Official copy).

(Continued)

*Primary Examiner* — Dirk Bass
*Assistant Examiner* — Hayden Brewster
(74) *Attorney, Agent, or Firm* — Morgan, Lewis & Bockius LLP (57) ABSTRACT

An eluate-collecting mechanism is constructed, including: a collection passage and having an inlet to be inserted into and removed from the upper end of a trap column and an outlet to be inserted into and removed from a collection container; a support member for supporting the collection passage in such a manner that the inlet is fixed while the outlet is vertically movable; a contact part provided at the outlet to come in contact with the collection container when the outlet is inserted into this container; and an elastic member for pressing the outlet downward so that a tip of the outlet is lower than the tip of the inlet, the elastic member being compressed when the support member and the collection container are brought closer to each other while keeping the contact part in contact with the container.

4 Claims, 3 Drawing Sheets

(51) Int. Cl.
*B01D 15/24* (2006.01)
*G01N 1/00* (2006.01)
*G01N 11/00* (2006.01)

(56) References Cited

U.S. PATENT DOCUMENTS

| | | | | |
|---|---|---|---|---|
| 2006/0096657 A1* | 5/2006 | Kubacki | ................ | G01N 30/88 141/130 |
| 2009/0152213 A1* | 6/2009 | Frazier | ............... | B01D 21/0006 210/800 |
| 2010/0281958 A1* | 11/2010 | Kono | .................... | B01D 15/24 73/61.53 |
| 2012/0118806 A1* | 5/2012 | Steinecker | ........... | B01D 15/206 210/198.2 |

FOREIGN PATENT DOCUMENTS

| | | |
|---|---|---|
| GB | 2465956 A | 6/2010 |
| JP | 02-122260 | 5/1990 |
| JP | 2003-149217 | 5/2003 |

OTHER PUBLICATIONS

Combined Search and Examination Report under Sections 17 and 18(3) for European Patent Application No. GB1308610.3 and dated Oct. 29, 2013.
Office Action issued in the corresponding Japanese Patent Application No. 2012-111178 dated Jul. 28, 2015 (English translation attached).

* cited by examiner

Prior Art

Fig. 3B

Prior Art

PREPARATIVE SEPARATION-PURIFICATION SYSTEM FOR CONTROLLING THE PASSAGE OF SOLUTION THEREIN

TECHNICAL FIELD

The present invention relates to a preparative separation-purification system for separately extracting one or more components from a solution by a liquid chromatograph, and purifying and collecting each of the components. More specifically, it relates to a preparative separation-purification system using a trap column for temporarily capturing a target component.

BACKGROUND ART

Preparative separation-purification systems using liquid chromatographs are used in the pharmaceutical fields or similar fields in order to collect samples for creating a library of various kinds of chemically synthesized compounds or analyzing the details of such compounds. Conventional examples of preparative separation-purification systems are disclosed in Patent Documents 1 and 2 as well as other documents.

In these apparatuses, target components (compounds) in a sample solution are temporally separated by a liquid chromatograph. The separated target components are introduced into respective trap columns and temporarily captured therein. Subsequently, a solvent (eluting solvent) is supplied to each trap column to quickly elute the component from the trap column and collect it in a container. Thus, a plurality of solutions, each of which contains one target component at a high concentration, are collected in respective containers. These separately collected solutions are then subjected to a vaporizing and drying process to remove the solvent and collect the target components in solid forms.

In the previously described type of preparative separation-purification system, a movable collecting mechanism is used to sequentially elute target components from a plurality of trap columns and collect each eluate in a different container.

Figure 3A:
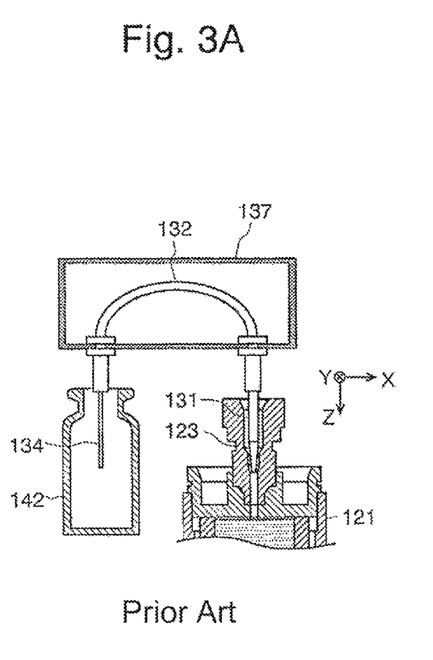
FIG. 3A shows the mechanism with the collection passage connected to both the trap column and the collection container.
Figure 3B:
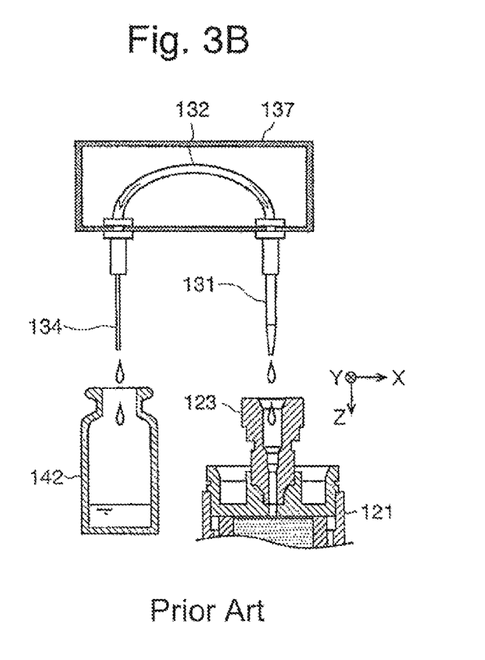
FIG. 3B shows the mechanism with the collection passage disconnected.

FIGS. 3A and 38 show one example of such a collecting mechanism. Although only one pair of trap column 121 and the collection container 142 is shown in FIGS. 3A and 3B, there are actually multiple pairs of trap columns 121 and collection containers 142 arranged in the direction perpendicular to the drawings sheet (i.e. the Y-direction in FIGS. 3A and 38). Each trap column 121 is almost vertically held, with the inlet end directed downward and the outlet end upward.

This collecting mechanism includes a tube 132 through which a liquid is to be passed, a needle 131 connected to one end of the tube 132, and an ejection nozzle 134 connected to the other end of the same tube 132. Both the needle 131 and the ejection nozzle 134 have an inner passage for allowing the liquid to pass through. The needle 131, the tube 132 and the ejection nozzle 134 form a collection passage for guiding an eluate from one trap column 121 into one collection container 142. The tube 132, the needle 131 and the ejection nozzle 134 are supported by a fraction collector head 137, which can be moved vertically (i.e. in the Z-direction in FIGS. 3A and 3B) as well as horizontally (i.e. in the X and Y directions in FIGS. 3A and 3B) by means of a drive mechanism (not shown).

By this collecting mechanism, an eluate from the trap column 121 is collected in the collection container 142 as follows: Initially, the fraction collector head 137 is horizontally moved so as to bring the needle 131 to a position directly above one of the trap columns 121. This operation simultaneously brings the ejection nozzle 134 to a position directly above one of the collection containers 142. From this position, the fraction collector head 137 is lowered to a level where the needle 131 is inserted into the needle port 123 provided at the outlet end of the selected trap column 121, and simultaneously, the ejection nozzle 134 is also inserted into the selected collection container 142 (FIG. 3A). As a result, the outlet end of the trap column 121 is connected to the collection container 142 through the collection passage. In this state, an eluting solvent is introduced from the inlet end of the trap column 121, and an eluate from the same column 121 (i.e. the eluting solvent containing a target component) is collected in the collection container 142.

After the collection of the eluate is completed, the supply of the eluting solvent to the trap column 121 is discontinued, and the fraction collector head 137 is moved upward. As a result, the needle 131 is removed from the needle port 123 of the trap column 121, and simultaneously, the ejection nozzle 134 is removed from the collection container 142 (FIG. 3B). Subsequently, the fraction collector head 137 is moved so as to insert the needle 131 and the ejection nozzle 134 into the next trap column and the next collection container, respectively, to perform collection of an eluate from this next trap column.

BACKGROUND ART DOCUMENT

Patent Document

Patent Document 1: JP-A H2-122260
Patent Document 2: JP-A 2003-149217

SUMMARY OF THE INVENTION

Problem to be Solved by the Invention

The previously described conventional collecting mechanism has the problem that, when the fraction collector head 137 is moved upward to disconnect both ends of the collection passage from the trap column 121 and the collection container 142, the eluate remaining in the collection passage drops from both ends of the same passage, allowing a portion of the eluate to flow back to the trap column 121. The arrows shown in the tube 132 in FIG. 3B indicate the directions of this flow of the eluate.

The present invention has been developed in view of the aforementioned point, and its objective is to provide a preparative separation-purification system in which the eluate in the collection passage is prevented from flowing back to the trap column when the collection passage is disconnected from the trap column and the collection container.

Means for Solving the Problems

The present invention aimed at solving the aforementioned problem is a preparative separation-purification system for passing a solution containing a target component through a trap column to capture the target component in the trap column, and for subsequently passing an eluting solvent through the trap column to elute the target component captured in the trap column and collect the eluted component in a collection container, including:

a) a column holder for holding the trap column so that an exit end of an inner passage of the trap column is directed upward;

b) a collection passage having an inlet to be inserted into and removed from the upper end of the trap column and an outlet to be inserted into and removed from the collection container;

c) a support member for supporting the collection passage in such a manner that the inlet is fixed while the outlet is vertically movable;

d) a contact part provided at the outlet so that it comes in contact with the collection container when the outlet is inserted in the collection container; and e) an elastic member for pressing the outlet downward so that the tip of the outlet is lower than the tip of the inlet, the elastic member being compressed when the support member and the collection container are brought closer to each other while keeping the contact part in contact with the collection container.

In the preparative separation-purification system according to the present invention having the previously described configuration, when the support member is moved upward from the position where the inlet and outlet of the collection passage are respectively inserted in the trap column and the collection container, the inlet, which is fixed to the support member, immediately follows the upward motion to be removed from the trap column. By contrast, the outlet, which is vertically movable with respect to the support member and subjected to a downward pressure from the elastic member, is maintained in the state of being inserted in the collection container until the support member reaches a predetermined level where the elastic member is released from the compressed state. That is to say, in the preparative separation-purification system according to the present invention, the inlet of the collection passage is disconnected from the trap column while the outlet of the same passage is still in the connected state, and then the outlet is disconnected after the inlet is lifted to a predetermined level higher than the outlet. During this process, due to the principle of siphons, the liquid remaining in the collection passage flows through the passage toward the outlet, to be eventually collected in the collection container. Thus, the liquid is prevented from flowing back to the trap column.

In one preferable mode of the preparative separation-purification system according to the present invention, the inner diameter of the inlet is smaller than that of the outlet.

This design helps the liquid in the collection passage flow toward the outlet, thus improving the effect of preventing the backflow of the liquid to the trap column.

Effect of the Invention

As described thus far, in the preparative separation-purification system according to the present invention, the backflow of the liquid from the collection passage to the trap column is effectively prevented when the collection passage is disconnected from the trap column and the collection container.

BRIEF DESCRIPTION OF THE DRAWINGS

FIGS. 2A and 2B are model diagrams of the collecting mechanism in the embodiment, where

FIGS. 3A and 3B are model diagrams of a conventional collecting mechanism, where

BEST MODE FOR CARRYING OUT THE INVENTION

Figure 1:
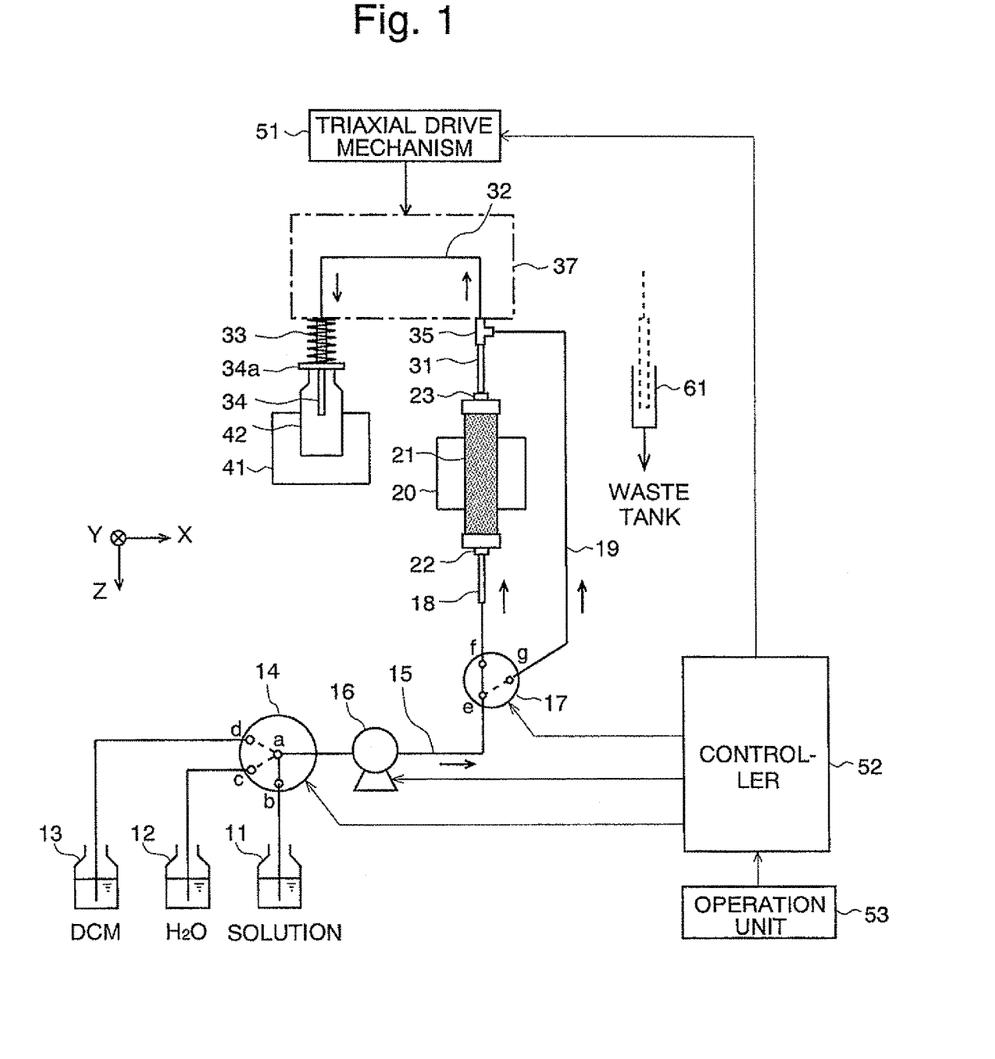
FIG. 1 is a schematic configuration diagram of a preparative separation-purification system according to one embodiment of the present invention.

Modes for carrying out the present invention will be hereinafter described by means of embodiments. FIG. 1 is a schematic configuration diagram of a preparative separation-purification system according to one embodiment of the present invention. The present system is designed for purifying a target component contained in a solution prepared by a preparative liquid chromatograph (not shown) and collecting the purified component in solid forms. It is also possible to modify the configuration to an "on-line" system in which a preparative liquid chromatograph is directly connected to the system to directly introduce a solution containing various components separated by the liquid chromatograph.

In FIG. 1, a solution container 11 holds a fraction of the solution prepared beforehand in the aforementioned manner. This solution contains a target component dissolved in a solvent which is mainly composed of a mobile phase used in the preparative liquid chromatograph. A wash-liquid container 12 holds pure water ($H_2O$) to be used for washing a column. A solvent container 13 holds dichloromethane (represented as "DCM" in FIG. 1) to be used as an eluting solvent. A three-way selector valve 14 is used for changing the passage configuration to selectively draw a liquid from one of the three containers 11, 12 and 13 and send it to a supply passage 15. The three-way selector valve 14 has three inlet ports b, c and d, with three tubes respectively connected thereto so as to draw one of the three liquids held in the solution container 11, the wash-liquid container 12 and the solvent container 13. The three-way selector valve 14 also has an outlet port a, to which one end of the aforementioned supply passage 15 is connected. The other end of the supply passage 15 is connected to the base end (i.e. the end opposite from the tip) of a first needle 18, which consists of a cylindrical needle with a pointed tip. A liquid-sending pump 16 for drawing and sending liquid at a predetermined flow rate is provided in the supply passage 15. A two-way selector valve 17 is provided between the pump 16 and the first needle 18. (The configuration and operation of this valve will be described later.)

A column rack 20 (which corresponds to the column holder in the present invention) holds a plurality of trap columns 21 arranged in the direction perpendicular to the drawings sheet (i.e. the Y-direction in FIG. 1). Each trap column 21 is packed with grains of filler for capturing a target component. On the column rack 20, each trap column 21 is almost vertically held, with the inlet end directed downward, to which the supply passage 15 is to be connected, and the outlet end directed upward, to which a tube 32 is to be connected.

A plurality of collection containers 42 for collecting separated and purified target components are held in a container rack 41 and arranged at intervals corresponding to the trap columns 21 in the direction perpendicular to the drawings sheet.

The preparative separation-purification system according to the present embodiment is provided with a movable collecting mechanism to collect an eluate from each of the trap columns 21 in a different container 42. The configuration of this collecting mechanism is hereinafter described with reference to FIGS. 2A and 2B.

Figure 2A:
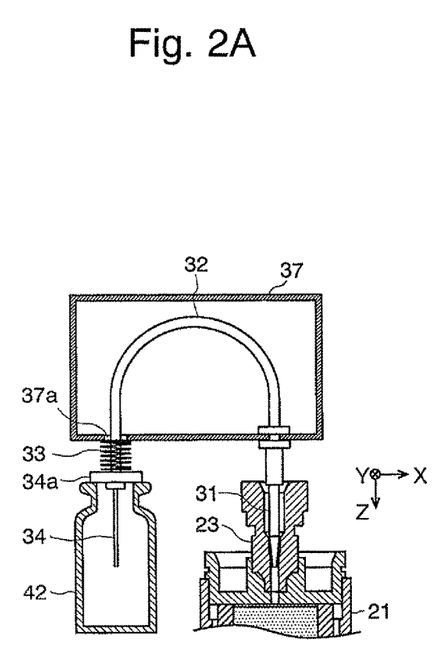
FIG. 2A shows the mechanism with the collection passage connected to both the trap column and the collection container.
Figure 2B:
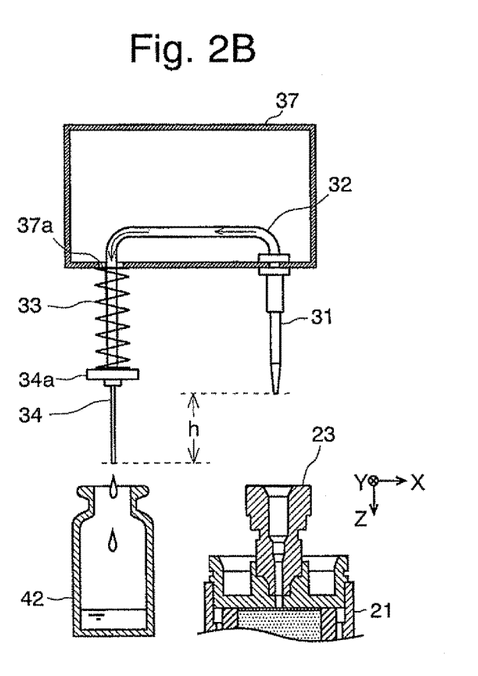
FIG. 2B shows the mechanism with the collection passage disconnected.

The collecting mechanism in the present embodiment includes a flexible tube 32, a fraction collector head 37 containing the tube 32, as well as a second needle 31 and an ejection nozzle 34, both of which are arranged on the lower side of the fraction collector head 37 with their tips directed downward. Among these elements, the second needle 31, the tube 32 and the ejection nozzle 34 correspond to the collection passage in the present invention, while the fraction collector head 37 corresponds to the support member in the present invention. One end of the tube 32 is connected to the base end of the second needle 31 via one opening provided at the bottom of the fraction collector head 37. The second needle 31 is fixed to the bottom side of the fraction collector head 37. The other end of the tube 32 is passed through another opening 37a provided at the bottom of the fraction collector head 37, and is connected to the base end of the ejection nozzle 34. The ejection nozzle 34 is not fixed to the fraction collector head 37, but vertically movable with respect to the fraction collector head 37.

A radial flange 34a (which corresponds to the contact part in the present invention) extending outward from the circumferential surface of the ejection nozzle 34 is provided at the upper end of the ejection nozzle 34 (or in an intermediate portion in its longitudinal direction). An elastic member 33 consisting of a coil spring is provided between the flange 34a and the fraction collector head 37. The elastic member 33 presses the ejection nozzle 34 downward so as to urge this nozzle 34 toward a position where the tip of the ejection nozzle 34 is lower than that of the second needle 31. In place of the coil spring, a cushioning material or similar member may be used as the elastic member 33.

The fraction collector head 37 can be moved vertically (i.e. in the Z-direction in FIG. 1) as well as horizontally (i.e. in the X and Y directions in FIG. 1) by means of a triaxial drive mechanism 51. By horizontally moving the fraction collector head 37, the second needle 31 can be moved to a position directly above any one of the trap columns 21 held in the column rack 20. This operation simultaneously brings the ejection nozzle 34 to a position directly above one collection container 42 held at the position in the container rack 41 corresponding to the aforementioned one of the trap columns 21. From this position, the fraction collector head 37 can be lowered to a level where the second needle 31 is inserted into the needle port 23 at the outlet end of the selected trap column 21 and the tip of the nozzle 34 is positioned inside the aforementioned collection container 42.

When the fraction collector head 37 is lowered, the tip of the ejection nozzle 34 initially enters the collection container 42, after which the lower side of the flange 34a comes in contact with the upper edge of the collection container 42. As the fraction collector head 37 is further lowered, the elastic member 33 becomes compressed, and the tube 32 protruding from the opening 37a is gradually pushed into the fraction collector head 37 (i.e., the distance from the tip of the ejection nozzle 34 to the bottom side of the fraction collector head 37 becomes shorter). Then, the fraction collector head 37 is further lowered until the tip of the second needle 31 reaches a predetermined depth in the trap column 21. Thus, the connections of the collection passage to the trap column 21 and the collection container 42 are completed. It is preferable that the positions of the trap column 21 and the collection container 42 as well as the lengths of the second needle 31 and the ejection nozzle 34 be appropriately designed beforehand so that the tip of the second needle 31 will be at roughly the same level as the tip of the ejection nozzle 34 or higher than that when the collection passage is in the connected state.

A disposal port 61 having a receiver and a disposal passage leading to a waste tank (not shown) is also placed within a range over which the fraction collector head 37 can be moved by the triaxial drive mechanism 51. By appropriately driving the fraction collector head 37 by the triaxial drive mechanism 51, the ejection nozzle 34 can be inserted into this disposal port 61.

The first needle 18 can also be moved vertically and horizontally by another drive mechanism (not shown). By using this mechanism, the first needle 18 can be moved horizontally to a position directly below one of the trap columns 21 held in the column rack 20 and then upward to a level where the needle 18 is inserted into the needle port 22 at the inlet end of the selected trap column 21 to connect the supply passage 15 to the inlet end of the same column 21.

A dilution passage 19 is connected to the two-way selector valve 17 provided in the supply passage 15. The two-way selector valve 17 is used for selectively directing the liquid drawn by the liquid-sending pump 16 to either the trap column 21 or the dilution passage 19. It has three ports e, f and g. A tube extending from the pump 16 (i.e. the upstream portion of the supply passage 15) is connected to port e; a tube leading to the first needle 18 (i.e. the downstream portion of the supply passage 15) is connected to port f; and one end of the dilution passage 19 is connected to port g. The other end of the dilution passage 19 is connected to the tube 32 via a T-joint 35 (which is omitted from FIGS. 2A and 2B for simplicity) provided near the second needle 31, whereby a liquid flowing through the dilution passage 19 (i.e. the diluting liquid) can be introduced into the tube 32.

A controller 52, including a central processing unit (CPU) and other elements, automatically conducts the preparative separation-purification process by performing the setting of the switching operations of the three-way selector valve 14 and the two-way selector valve 17, the operation of the liquid-sending pump 16 (e.g. the flow rate or flow velocity) as well as the driving operation of the triaxial drive mechanism 51, according to a predetermined program. An operation unit 53 allows users to enter or set conditions for the preparative separation-purification process and other information.

An operation of the automatic preparative separation-precipitation by the preparative separation-precipitation system of the present embodiment is hereinafter described. Initially, to capture a target component on the grains of the filler in the trap column 21, the controller 52 changes the passage configuration so as to connect the solution container 11 (port b) and the supply passage 15 (port a) by the three-way selector valve 14 as well as the supply passage 15 (port e) and the first needle 18 (port 0 by the two-way selector valve 17, and energizes the liquid-sending pump 16 to send the solution at a predetermined constant flow rate. Prior to this operation, the first needle 18 is connected to the needle port 22 at the inlet end of a predetermined trap column 21, the second needle 31 is connected to the needle port 23 at the outlet of the same trap column 21, and the ejection nozzle 34 is inserted into the disposal port 61.

The liquid-sending pump 16 draws the solution from the solution container 11 and sends it into the trap column 21 through its inlet end. Then, the target component in the solution is captured onto the grains of the filler in the trap column 21. The mobile phase from which the target component has been removed exits from the outlet end, to be discharged through the second needle 31, the tube 32 and the ejection nozzle 34 into the disposal port 61.

After the solution is supplied to the trap column 21 for a predetermined period of time or until the solution prepared in the solution container 11 is completely used, the controller 52 switches the three-way selector valve 14 to connect the wash-liquid container 12 (port c) and the supply passage 15 (port a). Then, the liquid-sending pump 16 draws pure water from the wash-liquid container 12 and sends it into the trap column 21 through its inlet end. As a result, unwanted water-soluble substances, such as salt that has adhered to the grains of the filler during the process of capturing the target component, are removed from the trap column 21, to be discharged through the second needle 31, the tube 32 and the ejection nozzle 34 into the disposal port 61. By this supply of pure water, the mobile phase remaining inside the trap column 21 immediately before the beginning of the supply of water is replaced by the water, and the trap column 21 becomes filled with water. The target component captured on the grains of the filler is strongly adsorbed and barely eluted into the water. Therefore, at this point, the target component remains in the captured state within the trap column 21.

Subsequently, the controller 52 switches the three-way selector valve 14 to connect the solvent container 13 (port d) and the supply passage 15 (port a). Then, the liquid-supply pump 16 begins to draw the eluting solvent (dichloromethane) and introduce it into the trap column 21 through its inlet end.

When the eluting solvent is supplied to the trap column 21, the target component captured on the grains of the filler is eluted into the solvent. Accordingly, the controller 52 calculates the period of time t1 required for completely removing the water, based on the void volume in the trap column 21 (i.e. the volume of water remaining in the trap column 21 immediately before the introduction of the eluting solvent begins) and the flow rate of the eluting solvent supplied by the pump 16. When the period of time t1 has elapsed from the beginning of the supply of the eluting solvent, the ejection nozzle 34 is removed from the disposal port 61 and inserted into a predetermined collection container 42 to begin preparative separation of the target component. In this state, the eluate containing the target component flows through the tube 32, to be eventually dropped from the ejection nozzle 34 into the selected collection container 42.

In the system of the present embodiment, it is possible to prevent clogging of the passage in the areas downstream from the outlet end of the trap column 21 by diluting the eluate in the tube 32 with the liquid supplied through the dilution passage 19. That is to say, under the command of the controller 52, the two-way selector valve 17 can be intermittently switched from the first needle 18 (port f) to the dilution passage 19 (port g) for a predetermined period of time after the eluting solvent begins to be discharged from the outlet end of the trap column 21. While the two-way selector valve 17 is switched to the dilution passage 19, the dichloromethane sucked by the pump 16 is directly sent into the tube 32 without passing through the trap column 21.

By this operation, the eluate containing the target component at a high concentration is diluted by the diluting liquid, so that deposition of the target component in the tube 32 is less likely to occur. Thus, in the present embodiment, the dichloromethane contained in the solvent container 13 serves not only as a solvent for eluting the target component from the trap column 21 but also as a liquid for diluting the eluate in the tube 32.

When intermittently introducing the diluting liquid in the previously described manner, the eluate from the trap column 21 (dichloromethane with the target component contained therein) and the diluting liquid introduced from the dilution passage 19 (dichloromethane with no target component contained therein) alternately flow in the tube 32. Therefore, even if the target component in the eluate leaves deposits on and sticks to the tube or valve while the eluate is flowing through the tube 32, the deposited compound will be dissolved in the subsequently supplied diluting liquid, whereby clogging of the passage is effectively prevented.

Since the amount of target component captured by the filler in the trap column 21 is limited, the concentration of the target component contained in the eluate decreases after a certain period of time from the beginning of the introduction of the diluting solvent into the trap column 21. Accordingly, when a predetermined period of time has elapsed from the beginning of the preparative separation process, or when a predetermined amount of diluting solvent has been supplied, the controller 52 de-energizes the liquid-sending pump 16 to complete the preparative separation process.

After the preparative separation-purification process using one pair of the trap column 21 and the collection container 42 is completed, the controller 52 operates the triaxial drive mechanism 51 to move the fraction collector head 37 upward to disconnect the collection passage (i.e. the second needle 31, the tube 32 and the ejection nozzle 34) from the trap column 21 and the collection container 42.

In this operation, as the fraction collector head 37 is gradually lifted from the position shown in FIG. 2A, the second needle 31 fixed to the fraction collector head 37 moves upward, to be eventually removed from the needle port 23. Thus, the inlet of the collection passage is disconnected from the trap column 21. On the other hand, the ejection nozzle 34, which is vertically movable with respect to the fraction collector head 37 and is subject to the downward pressure from the elastic member 33, does not immediately follow the upward motion. Thus, the connection between the outlet of the collection passage and the collection container 42 is maintained at this stage.

With the upward motion of the fraction collector head 37, the elastic member 33 gradually expands, letting the tube 32 in the fraction collector head 37 be extracted through the opening 37a (i.e., the distance from the tip of the ejection nozzle 34 to the bottom side of the fraction collector head 37 becomes longer). When the fraction collector head 37 reaches a predetermined level, the elastic member 33 is released from the compressed state, after which the ejection nozzle 34 begins to follow the upward motion of the fraction collector head 37, to be eventually removed from the collection container 42. Thus, the outlet of the collection passage is disconnected from the collection container 42.

It is preferable to appropriately determine the level difference between the tip of the second needle 31 and that of the ejection nozzle 34 in the completely disconnected position (i.e. the height h in FIG. 2B) taking into account the kind of liquid remaining in the collection passage, the material of the tube 32, the diameter of the tube 32 and other factors. For example, if the tube 32 is a polytetrafluoroethylene (PTFE) tube with an inner diameter of 1.0 mm and the eluting solvent is dichloromethane/methanol (9:1, v/v), the height h should be 30 mm or greater.

Thus, in the collecting mechanism of the present embodiment, when the fraction collector head 37 is moved upward after completion of a preparative separation process, only the connection between the second needle 31 and the trap column 21 is initially cancelled. The ejection nozzle 34 is not removed from the collection container 42 until the tip of the second needle 31 reaches a level adequately higher than the tip of the ejection nozzle 34. Due to the controlled disconnecting process, the eluate remaining in the collection passage is made to entirely flow toward the ejection nozzle 34. Thus, the eluate is assuredly collected in the collection container 42 without flowing back to the trap column 21.

In the case where the preparative separation-purification process using another trap column on the column rack 20 is to be performed, the fraction collector head 37 is moved by the triaxial drive mechanism 51 to connect the second needle 31 to the outlet end of the next trap column, and simultaneously, the ejection nozzle 34 is inserted into the disposal port 61. The first needle 18 is also moved by another drive mechanism (not shown) so as to be connected to the inlet end of the aforementioned next trap column. After the solution container 11 is replaced with a new one holding a different solution (which contains a target component to be separated and purified the next time), the previously described preparative separation-purification process is similarly performed. Instead of letting users manually replace solution containers 11, the system may include a mechanism for changing the passage configuration so as to automatically connect another solution container to the supply passage 15. Such a mechanism can be easily created by adding a passage selector valve.

After the fractions of eluate containing different target components have been thus collected in the respective collection containers 42, the target components can be extracted in solid forms by heating the eluate or centrifuging it under a vacuum.

It should be noted that the previous embodiment is a mere example of the present invention. Any change, modification or addition appropriately made within the spirit of the present invention will evidently fall within the scope of claims of the present patent application.

For example, in the preparative separation-purification system according to the present invention, the inner diameter of the inlet may be smaller than that of the outlet. This design helps the liquid in the collection passage flow toward the outlet, thus improving the effect of preventing the backflow of the liquid to the trap column 21. Such a configuration can be realized, for example, by using a second needle 31 whose inner diameter is smaller than that of the ejection nozzle 34.

EXPLANATION OF NUMERALS

11 . . . Solution Container
12 . . . Wash-Liquid Container
13 . . . Solvent Container
14 . . . Three-Way Selector Valve
15 . . . Supply Passage
16 . . . Liquid-Sending Pump
17 . . . Two-Way Selector Valve
18 . . . First Needle
19 . . . Dilution. Passage
20 . . . Column Rack
21 . . . Trap Column
22, 23 . . . Needle Port
31 . . . Second Needle
32 . . . Tube
33 . . . Elastic Member
34 . . . Ejection Nozzle
34a . . . Flange
37 . . . Fraction Collector Head
41 . . . Container Rack
42 . . . Collection Container
51 . . . Triaxial Drive Mechanism
52 . . . Controller
53 . . . Operation Unit
61 . . . Disposal Port

The invention claimed is:

1. A preparative separation-purification system, comprising:
a column holder for holding a trap column so that an exit end of an inner passage of the trap column is directed upward;
a collection passage having an inlet to be inserted into and removed from the exit end of the inner passage of the trap column and an outlet to be inserted into and removed from a collection container;
a liquid-sending mechanism for alternatively sending either a solution containing a target component or an eluting solvent through the trap column;
a support member for supporting the collection passage therein, wherein the inlet is fixed to the support member while the outlet is vertically movable relative to the support member such that a portion the collection passage is retractable into and extendable out of the support member;
a drive mechanism for vertically moving the support member;
a contact part attached at the outlet so that it comes in contact with the collection container when the outlet is inserted in the collection container;
an elastic member disposed between the support member and the contact part; and
a controller programmed to control the liquid-sending mechanism and the drive mechanism to pass the solution containing the target component through the trap column to capture the target component in the trap column, and subsequently pass the eluting solvent through the trap column to elute the target component captured in the trap column and collect an eluted component in the collection container,
wherein, in one state, the elastic member is in a state of natural length so that a tip of the outlet is lower than a tip of the inlet when the controller controls the drive mechanism to move the support member upward, so that the inlet and the trap column are not connected to each other and the outlet and the collection container are not connected to each other, and in another state, the elastic member is compressed when the controller controls the drive mechanism to move the support member downward so that the support member and the collection container are brought closer to each other while keeping the contact part in contact with the collection container.

2. The preparative separation-purification system according to claim 1, wherein an inner diameter of the inlet is smaller than an inner diameter of the outlet.

3. A preparative separation-purification system, comprising:
a collection passage having an inlet to be inserted into and removed from an exit end of an inner passage of a trap column and an outlet to be inserted into and removed from a collection container;
a liquid-sending mechanism for alternatively sending either a solution containing a target component or an eluting solvent through the trap column;

a support member for supporting the collection passage wherein the inlet is fixed to the support member while the outlet is vertically movable relative to the support member such that a portion of the collection passage is extendable away from and retractable towards the support member;

a drive mechanism for vertically moving the support member;

a flange attached at the outlet for contacting with the collection container when the outlet is inserted in the collection container;

an elastic member disposed between the support member and the flange; and a controller programmed to control the liquid-sending mechanism and the drive mechanism to pass the solution containing the target component through the trap column to capture the target component in the trap column, and subsequently pass the eluting solvent through the trap column to elute the target component captured in the trap column and collect an eluted component in the collection container, wherein, in one state, the elastic member is in a state of natural length whereby the collection passage extends out of the support member at the side of the outlet to cause a tip of the outlet to be lower than a tip of the inlet when the controller controls the drive mechanism to move the support member upward, such that the inlet and the trap column are detached and the outlet and the collection container are detached, and in another state, the elastic member is elastically compressed when the controller controls the drive mechanism to move the support member downward so that the support member and the collection container are brought closer together when the flange contacts with the collection container and the inlet and the trap column are attached and the outlet and the collection container are attached.

4. A preparative separation-purification system for passing a solution containing a target component, comprising:

a trap column to capture the target component;

a collection container for collecting an eluted component;

a collection passage having an inlet to be inserted into and removed from an exit end of an inner passage of the trap column and an outlet to be inserted into and removed from the collection container;

a liquid-sending mechanism for alternatively sending either a solution containing a target component or an eluting solvent through the trap column;

a support member for supporting the collection passage wherein the inlet is fixed to the support member while the outlet is vertically movable relative to the support member such that a portion of the collection passage is extendable away from and retractable towards the support member;

a drive mechanism for vertically moving the support member;

a flange attached at the outlet for contacting with the collection container when the outlet is inserted in the collection container;

an elastic member disposed between the support member and the flange; and a controller programmed to control the liquid-sending mechanism and the drive mechanism to pass the solution containing the target component through the trap column to capture the target component in the trap column, and subsequently pass the eluting solvent through the trap column to elute the target component captured in the trap column and collect an eluted component in the collection container, wherein, in one state, the elastic member is in a state of natural length whereby the collection passage extends out of the support member at the side of the outlet to cause a tip of the outlet to be lower than a tip of the inlet when the controller controls the drive mechanism to move the support member upward, such that the inlet and the trap column are detached and the outlet and the collection container are detached, and in another state, the elastic member is elastically compressed when the controller controls the drive mechanism to move the support member downward so that the support member and the collection container are brought closer together when the flange contacts with the collection container and the inlet and the trap column are attached and the outlet and the collection container are attached.

* * * * *